US012212730B2

(12) United States Patent
Bhadula et al.

(10) Patent No.: US 12,212,730 B2
(45) Date of Patent: *Jan. 28, 2025

(54) SYSTEMS AND METHODS FOR IMPROVED DELIVERY AND DISPLAY OF 360-DEGREE CONTENT

(71) Applicant: Adeia Guides Inc., San Jose, CA (US)

(72) Inventors: Ishan Bhadula, Uttarakhand (IN); Vivek Sehgal, Uttar Pradesh (IN); Greeshma Jagadha Phani Lakshmi Alapati, Andhra Pradesh (IN); Srikanth Channapragada, Karnataka (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,815

(22) Filed: Jun. 9, 2023

(65) Prior Publication Data
US 2023/0319249 A1    Oct. 5, 2023

Related U.S. Application Data

(63) Continuation of application No. 17/502,836, filed on Oct. 15, 2021, now Pat. No. 11,716,454.

(51) Int. Cl.
*H04N 13/117*    (2018.01)
*H04L 65/70*    (2022.01)
(Continued)

(52) U.S. Cl.
CPC .......... *H04N 13/117* (2018.05); *H04L 65/70* (2022.05); *H04N 13/161* (2018.05);
(Continued)

(58) Field of Classification Search
CPC .. H04N 13/117; H04N 13/161; H04N 13/178; H04N 21/25891; H04N 21/812;
(Continued)

(56) References Cited

U.S. PATENT DOCUMENTS

| 10,062,414 B1 | 8/2018 | Westphal |
| 11,303,881 B2 | 4/2022 | Zhou |

(Continued)

FOREIGN PATENT DOCUMENTS

WO    2018136301 A1    7/2018

OTHER PUBLICATIONS

International Search Report and Written Opinion of PCT/US2022/046720 dated Jan. 27, 2023.

*Primary Examiner* — John R Schnurr
(74) *Attorney, Agent, or Firm* — Haley Guiliano LLP

(57) ABSTRACT

Systems and methods are provided for generating a viewport for display. A user preference for a character and/or a genre of a scene in a spherical media content item is determined, wherein the spherical media content item comprises a plurality of tiles. A tile of the plurality of tiles is identified based (Continued)

on the determined user preference. A viewport to be generated for display at a computing device is predicted, based on the identified tile. A first tile to be transmitted to a computing device at a first resolution is identified, based on the predicted viewport to be generated for display. The tile is transmitted, to the computing device, at the first resolution.

17 Claims, 13 Drawing Sheets

(51) Int. Cl.
*H04N 13/161* (2018.01)
*H04N 13/178* (2018.01)
*H04N 21/258* (2011.01)
*H04N 21/81* (2011.01)
*H04N 21/84* (2011.01)

(52) U.S. Cl.
CPC ..... *H04N 13/178* (2018.05); *H04N 21/25891* (2013.01); *H04N 21/812* (2013.01); *H04N 21/84* (2013.01)

(58) Field of Classification Search
CPC ...... H04N 21/84; H04N 19/37; H04N 19/597; H04N 21/21805; H04N 21/234363; H04N 21/816; H04N 21/234345; H04L 65/70; G06V 10/50; G06V 10/25
See application file for complete search history.

(56) References Cited

U.S. PATENT DOCUMENTS

| | | | |
|---|---|---|---|
| 11,716,454 B2 * | 8/2023 | Bhadula | H04N 13/161 348/47 |
| 2017/0026577 A1 | 1/2017 | You et al. | |
| 2018/0077451 A1 | 3/2018 | Yip et al. | |
| 2018/0302591 A1 | 10/2018 | Pio et al. | |
| 2018/0332317 A1 * | 11/2018 | Song | H04N 13/344 |
| 2019/0158815 A1 | 5/2019 | He et al. | |
| 2019/0356894 A1 * | 11/2019 | Oh | H04N 21/234345 |
| 2020/0045285 A1 | 2/2020 | Varerkar et al. | |
| 2020/0128280 A1 | 4/2020 | Han et al. | |
| 2020/0336722 A1 | 10/2020 | Gibbon et al. | |
| 2020/0382764 A1 | 12/2020 | Oyman et al. | |
| 2020/0404327 A1 | 12/2020 | Han et al. | |
| 2021/0051306 A1 | 2/2021 | Han et al. | |
| 2021/0092347 A1 | 3/2021 | Han et al. | |
| 2021/0110610 A1 | 4/2021 | Xu et al. | |
| 2021/0314670 A1 | 10/2021 | Atluru et al. | |
| 2023/0119626 A1 | 4/2023 | Bhadula et al. | |

* cited by examiner

SYSTEMS AND METHODS FOR IMPROVED DELIVERY AND DISPLAY OF 360-DEGREE CONTENT

CROSS REFERENCE TO RELATED APPLICATIONS

This application is a continuation of U.S. patent application Ser. No. 17/502,836, filed Oct. 15, 2021, the disclosures of which is hereby incorporated by reference herein in its entirety.

BACKGROUND

The present disclosure is directed towards systems and methods for generating a viewport for display. In particular, systems and methods are provided herein for generating a viewport for display based on a user preference for a character and/or a genre of a scene in a spherical media content item.

SUMMARY

The proliferation of cameras with multiple lenses that enable users to record video in multiple vantage points at the same time has enabled media content to be created and consumed in ways that differ from traditional video cameras with a single lens. For example, such cameras enable users to record 180-degree or 360-degree videos. These cameras may be used to create monoscopic or stereoscopic content (i.e., with the same picture being delivered to the screens of a virtual reality (VR) headset or with different pictures being delivered to the screens of a VR headset). A virtual reality headset is typically worn on a user's head and receives content in ultra-high resolutions and frame rates. The media content item resulting from a recording via the camera, for example, an omnidirectional, panoramic or spherical media content item, can be uploaded to a video sharing platform, such as YouTube, and users can stream the spherical media content item to a computing device, such as a laptop or a VR headset. In the example of the laptop, the video is flattened, and the user may use, for example, a mouse to move the output of the spherical content item. In the example of the VR headset, as a user moves their head, the VR headset will generate and display different portions of the spherical media content item to the user. The portion of the spherical media content that is displayed to the user may be known as a viewport. As the user moves around the spherical media content, for example, via a mouse or via moving their head, the viewport changes.

Various methods may be utilized in order to reduce the amount of bandwidth and/or processing power that is required to stream spherical media content items. One example method is that of projecting an equirectangular frame and grid onto the spherical content item, wherein only a subset of the squares/rectangles (i.e., tiles) formed by the grid is sent to the computing device at a full resolution. The subset of tiles can be dictated by the viewport, for example, only the tiles that are displayed to the user are streamed in full resolution. In some example systems, the tiles are streamed to the computing device via an HTTP-based solution for adaptive bitrate streaming, such as via the dynamic adaptive streaming over HTTP (DASH) standard that responds to user device and network conditions. In another example, the tiles immediately surrounding the viewport may be streamed in a lower resolution, and the other tiles may not be streamed at all. However, as a user can move around the spherical media content item at will, if, for example, a user wearing a VR headset were to suddenly turn around on the spot and no tiles had been streamed, then there might be an unacceptable delay and/or spike in required bandwidth and/or processing power in order to respond to generating the new viewport for display. In order to avoid any delay and/or spike in required bandwidth and/or processing power, the system may utilize a system for predicting future viewports based on, for example, sensors embedded within a VR headset to track, for example, user head movements and/or user eye gaze. In other examples, saliency maps and/or recent data pertaining to user head movement and orientation may be utilized in order to predict the upcoming viewport. In addition, different people behave differently when consuming spherical media items. For example, some people may look away from shocking content, whereas other people may look at the same content. Any improvements in predicting future user viewports will lead to reductions in the delay associated with generating a new viewport and better utilization of computing resources, such as bandwidth and/or processing power.

In view of the foregoing, it would be beneficial to have a system that is capable of predicting a user's future viewport.

Systems and methods are described herein for generating a viewport for display. In accordance with a first aspect of the disclosure, a method is provided for generating a viewport for display. The method includes determining a user preference for a character and/or a genre of a scene in a spherical media content item, where the scene comprises a plurality of tiles. A tile of the plurality of tiles is identified based on the determined user preference, and a viewport to be generated for display at a computing device is predicted based on the identified tile. A first tile to be transmitted to a computing device at a first resolution is identified, based on the predicted viewport to be generated for display, and the tile is transmitted to the computing device at the first resolution. A tile to be received at the computing device at a second resolution may be identified based on the predicted viewport to be generated for display, with the first resolution being higher than the second resolution. The tile may be transmitted to the computing device at the second resolution. Determining a user preference for a character and/or genre of a scene may further comprise determining at least one of user movement, user orientation, one or more environmental factors and/or one or more user physiological factors.

In an example system, a user streams a spherical media content item from an over-the-top (OTT) provider to a VR device. As the spherical media content item is being streamed, a user preference for a character is identified. For example, the user may be streaming a 360-degree episode of "Ozark" and it may be identified that the user has a preference for looking at the character Marty. This may be identified, for example, via sensors of the VR device that track user eye movement. A scene of the spherical media item may be divided into tiles, and the tile or tiles associated with the character Marty may be identified, for example, the tiles in which Marty appears. As the spherical media content item progresses forward in time, the tiles associated with Marty will change, as the character Marty, for example, walks around. Face recognition may be used, for example, to keep track of which tiles are associated with Marty as the time progresses through the spherical media content item. Based on the tile(s) in which Marty appears, a viewport is predicted. For example, Marty may be in the middle of the viewport and the viewport may comprise the tiles surrounding Marty as well. In another example, Marty may be interacting with another character, so the viewport may predominantly comprise the tiles to one side of Marty. Image recognition may be used to help predict the viewport. If, for example, Marty is running, then a viewport that tracks Marty's movement may be predicted. Once the viewport has been predicted, tiles associated with the predicted viewport may be identified. These tiles are then requested and are streamed to the VR device at, for example, full resolution. A full resolution may be 8K, 4K, 1080p or 720p, depending on the available bandwidth and/or processing power. In some examples, tiles proximate to the predicted viewport may be steamed at a lower resolution than the tiles predicted to form the viewport, for example, in 4K, 1080p, 720p or 520p, depending on the first resolution and the available bandwidth and/or processing power. If a user moves their head in a manner that causes a viewport that is different to the predicted viewport to be generated for display, then the necessary tiles are identified and transmitted to the VR device to enable the viewport to be generated for display.

Metadata may be associated with the spherical media content item, and identifying the tile of the plurality of tiles may be further based on the metadata associated with the spherical media content item. In an example system, each of the tiles of the spherical media content item may have metadata indicating characters, objects and/or a genre associated with the tile.

Determining a user preference for a character and/or a genre of a scene in a spherical media content item may further comprise identifying a plurality of objects in a scene of the spherical media content item, tagging the plurality of objects, and generating a preference map based on the identified objects. Identifying the tile of the plurality of tiles may be further based on the generated preference map. An advertisement may be identified based on an object of the plurality of objects. The advertisement may be associated with the first tile and may be transmitted to the computing device. At the computing device, the advertisement may be generated for display, and an effectiveness of the advertisement may be determined based on input from a sensor of the computing device. In an example system, image recognition may be used to identify the objects of a scene and tags identifying the object may be generated, for example, "can," "Coke." This may be performed substantially in real time, or may be performed offline at, for example, a server. In some examples, an advertisement may be identified based on an identified object. For example, if a can of Coke has been identified in a scene, then an advertisement for Coke may be generated for display and inserted into the viewport. In some examples, a user can interact with the advertisement, for example, taking them to a website associated with the product. An effectiveness of the advertisement may be determined via a sensor of the computing device, for example, a sensor that tracks user eye gaze. If a user looks at an advertisement for a threshold amount of time, then the advertisement may be determined to be effective; however, if a user does not look at an advertisement at all, then the advertisement may be determined not to have been effective.

The determined user preference for a character and/or a genre of a scene may be associated with the computing device. The computing device may be added to a group of computing devices, and the grouping may be based on the determined user preference for a character and/or a genre of a scene associated with the computing device. The tile may be transmitted at the first resolution to the computing devices of the group of computing devices. In an example system, it may be determined that a plurality of user devices are associated with a preference for the character Marty, as discussed above in connection with a single user. In order to save bandwidth and/or processing power, these users may be grouped together, and it may be assumed that these users have the same predicted viewport. As such, all users may have the same tile (or tiles) transmitted at a full resolution to their VR devices. If a user of the group moves their head in an unexpected manner, then an additional tile (or tiles) may be transmitted in order to enable the requested viewport to be generated for display.

A subset of the plurality of tiles of the spherical media content may be transmitted to the computing device. At least one incomplete viewport comprising a tile not transmitted to the computing device may be identified and, if the predicted viewport is within a threshold number of tiles of the incomplete viewport, a notification may be generated for display. In an example system, bandwidth constraints may be identified. In this case, the VR device may not be able to receive tiles for a new viewport, even if the user moves their head, as there may be enough bandwidth to transmit only tiles comprising the current viewport and/or proximate to the current viewport. In order to prevent a viewport from being requested that cannot be transmitted to the user device due to the bandwidth constraints, a notification may be generated for display that, for example, warns a user not to move their head too far in a certain direction.

There may be provided a viewport prediction server and an encoder that perform the following actions in response to a request from a streaming server. The viewport prediction server may determine the user preference for a character and/or a genre of a scene, and the user preference may be based on a plurality of users. The user preference for a character and/or a genre of a scene may be transmitted from the viewport prediction server to the encoder. The encoder may identify a subset of the plurality of tiles based on the determined user preference and predict, based on the identified subset of tiles, the viewport to be generated for display. The encoder may also identify, based on the predicted viewport to be generated for display, a first subset of tiles to be transmitted at a first resolution and encode, at a first priority, the first subset of tiles at the first resolution. The tiles that are not included in the first subset of tiles may be encoded at a second priority, and the second priority may be lower than the first priority.

Identifying the first tile to be transmitted to a computing device at a first resolution may be further based on a status of the computing device transmitting the tiles. In an example system, if a server is overburdened by requests, low-quality resolution tiles may be transmitted to a VR headset. In this example, the server status has overridden the user preference.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1A:
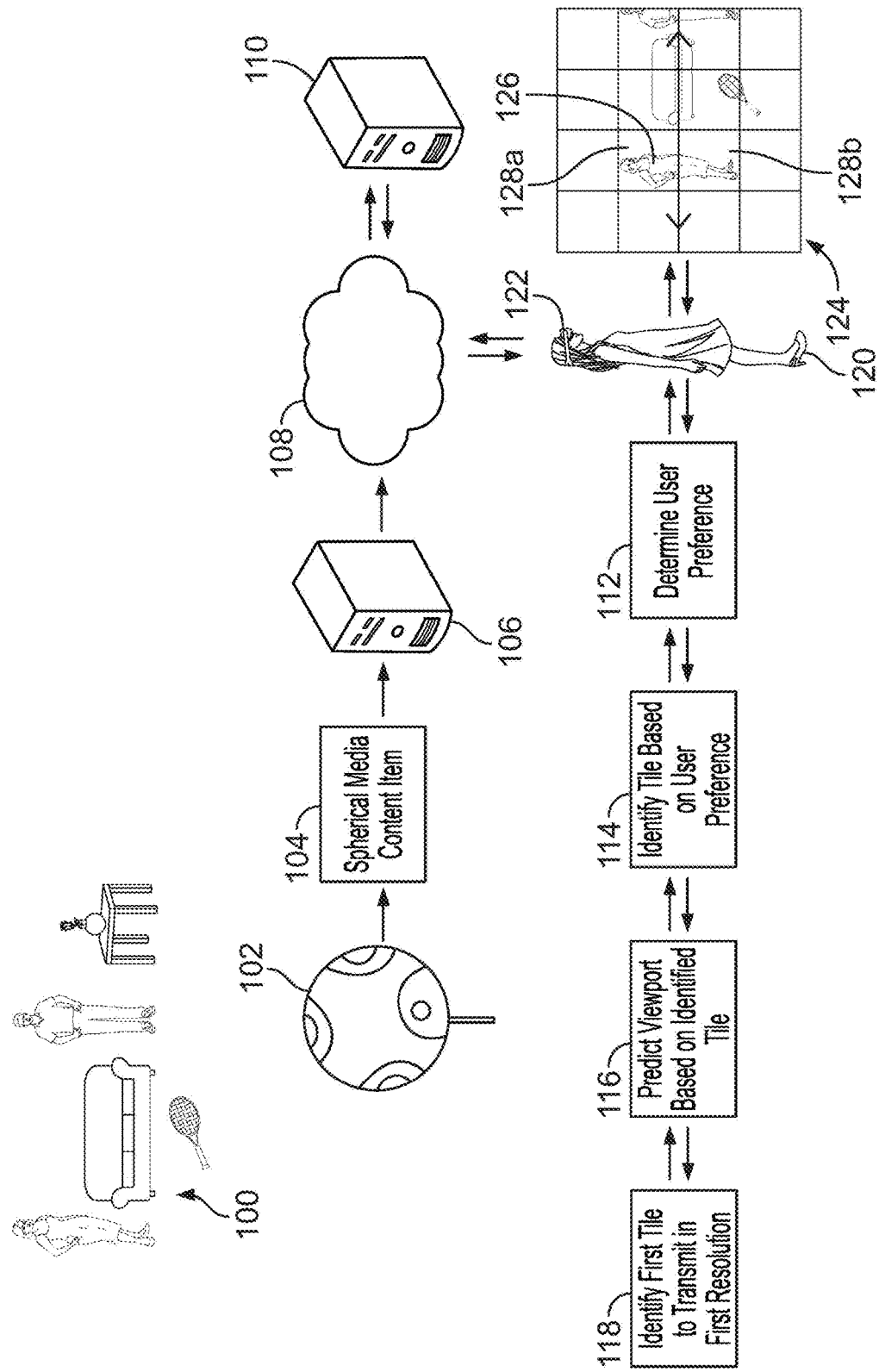
FIG. 1A shows an example environment in which a viewport is generated for display, in accordance with some embodiments of the disclosure.

Systems and methods are described herein for generating a viewport for display. When recording using a camera with multiple lenses, an omnidirectional, panoramic or spherical media content item is created by stitching together, via software, the content captured by each lens of the camera. The spherical media content item referred to herein encompasses omnidirectional and panoramic media content items. The spherical media content item may be a monoscopic or a stereoscopic 180-degree or 360-degree recording. In addition, the spherical media content may be in an equirectangular, fisheye or dual fisheye format. A stereoscopic media content item may comprise two equirectangular videos that are stitched together to form an image that is 360 degrees in the horizontal direction and 180 degrees in the vertical direction. The media content item may comprise a plurality of frames, each frame comprising a plurality of tiles. A viewport is the portion of the spherical media content item that is generated for display at user equipment. The spherical media content may comprise tiles that are formed projecting an equirectangular frame and grid onto the spherical content item. Typically, a spherical media content item will be streamed to (or played at) a computing device such as a VR headset; however, a spherical media content item may also be streamed to (or played at) a computing device such as a laptop. In the case of a laptop, the video is flattened, and the user may use, for example, a mouse to move the output of the spherical content item. In the example of the VR headset, as a user moves their head, the VR headset will generate and display different portions of the spherical media content item to the user.

A user preference may be determined via a sensor of a computing device, for example, by monitoring the head movement and/or gaze of a user to determine how long a user looks at a certain character or a certain scene. As such, a determined user preference may not reflect the actual preference of a user; however, it may still be of use in predicting the movement of a viewport.

An advertisement is media content that describes an item and/or service. For example, it may comprise video and/or a still image. It may comprise data describing the item, such as a price of the item. In some examples, an advertisement may comprise a link and/or a quick response (QR) code to an e-commerce site selling the item. An advertisement may be interactive, for example, it may enable a user to play a game.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Predicting a user preference may take into account the different ways that people behave when consuming spherical media content items. For example, some viewers might look away if they encounter content that they do not like, whereas other viewers might fast-forward through the content or even watch it. Some viewers may prefer to watch some content at a faster speed or may intentionally fast-forward through content to reach a specific portion (for example, a user might be interested in specific portion of a late-night show).

Predicting a user preference may also take advantage of television series, such as sitcoms, that normally film the show in similar environments. Additionally, it may be common to see many of the same cast in different episodes and seasons of a television series. The similarities may be utilized in order to predict the future viewport of a user. Predicting the viewport of a user during a VOD streaming session may be based in part on the user's favorite or least-liked characters in a TV series, as well as genres of specific scenes. Such user preferences may be collected from past viewing sessions as well as in real time while a user is watching a current episode, in order to refine the prediction. For example, a new character might have been introduced in the current episode of a television series, and therefore tracking a user's actions with respect to the new character may be used to refine the user's preference, which may be associated with a user profile. A user preference profile for a television series, or a genre of content, may be generated. This user preference profile can be utilized to predict future viewports when a user consumes a similar spherical media content item, such as a different episode of a television series or a movie of a similar genre.

Although many of the steps described within, such as the determining of a user preference, identifying a tile based on the user preference, predicting a viewport and identifying one or more first tiles are depicted and described as being carried out on a user device, such as a VR headset, and/or at an application running on the user device, such as a media player, any of the steps, including the aforementioned steps, may be carried out at a server. In addition, where actions are discussed as being performed at a VR device, this includes by an application running on a VR device, such as a media player.

FIG. 1A shows an example environment in which a viewport is generated for display, in accordance with some embodiments of the disclosure. The environment comprises a scene 100 that is recorded by a 360-degree camera 102. The recording is saved as a spherical media content item 104 and is transferred to a computing device, such as a PC 106. In this example, the spherical media content item 104 is transmitted, via a network 108, such as the internet, from the PC 106 to a server 110. The network 108 may comprise wired and/or wireless means for transmitting the request to the server 110. In some examples, the server 110 is an edge server. The spherical media content item 104 is transmitted, from the server 110, to a computing device, such as VR device 122, via the network. At the VR device 122, a user preference for a character and/or a genre of a scene in a spherical media content item is determined 112. For example, the user may be streaming a 360-degree episode of "Ozark" and it may be identified that the user has a preference for looking at the character Marty. This may be identified, for example, via sensors of the VR device that track user head movement, eye movement and/or head orientation. The user preference may, optionally, be associated with a user profile, stored, for example, at server 110. One or more tiles of the spherical media content item may be identified 114 based on the determined user preference. For example, the tiles associated with the character Marty may be identified, such as the tiles in which Marty appears. As the spherical media content item progresses forward in time, the tiles associated with Marty will change, as the character Marty, for example, walks around.

A viewport based on the identified one or more tiles is predicted. Face recognition may be used, for example, to keep track of which tiles are associated with Marty as the time progresses through the spherical media content item. A viewport is predicted 116 based on the identified tile. For example, based on the one or more tiles in which Marty appears, a viewport may be predicted. For example, Marty may be in the middle of the viewport and the viewport may comprise the tiles surrounding Marty as well. In another example, Marty may be interacting with another character, so the viewport may predominantly comprise the tiles to one side of Marty. Image recognition may be used to help predict the viewport. If, for example, Marty is running, then a viewport that tracks Marty's movement may be predicted. A first tile (or tiles) to transmit in a first resolution is identified 118 based on the predicted viewport. In some examples, a plurality of tiles are identified to transmit at the first resolution. For example, a first tile that is to appear in the predicted viewport is identified to be transmitted at a full HD resolution (e.g., 8K, 4K, 1080p, 720p). The identified one or more tiles are requested and transmitted from the server 110, via the network 108, to the computing device that, in this example, is worn by a user 120 and is a VR device 122. If the viewport at the VR device 122 is the one predicted, then the transmitted one or more tiles are generated for display and are displayed to the user 120 at the VR device 122. However, if the user, for example, moves their head in a manner that was not predicted, an additional one or more tiles are requested and are transmitted to the VR device 122. In some examples, these additional one or more tiles may be at a lower resolution than the tiles of the predicted viewport, especially if there are bandwidth constraints.

A representation of the viewport 124, with a grid of tiles overlaid, is also shown. As can be seen, viewport 124 does not display the entirety of the spherical media content item; rather it comprises only the part of the spherical media content item that is generated for display to the user. The character 126, for which it has been determined that the user has a preference, is associated with two tiles 128a, 128b; however, the viewport comprises more tiles than just those associated with the character. The one or more tiles that are identified in step 114 may be associated with the character 126, such as tile 128a and/or tile 128b. However, as can be seen in this example, the character might not be based in the center of the viewport, so predicting the viewport 116 may comprise an element of scene recognition, taking into account factors such as whether the character 126 is moving or is stationary. In this way, a method of predicting a viewport based on a user preference for a character and/or a scene of a spherical media content item is provided. Advantages associated with the method include reducing network traffic, conserving bandwidth and reducing processing power associated with streaming a spherical media content item. This advantage is achieved because only a subset of the tiles of the spherical media content item are streamed at full resolution to the computing device.

Figure 1B:
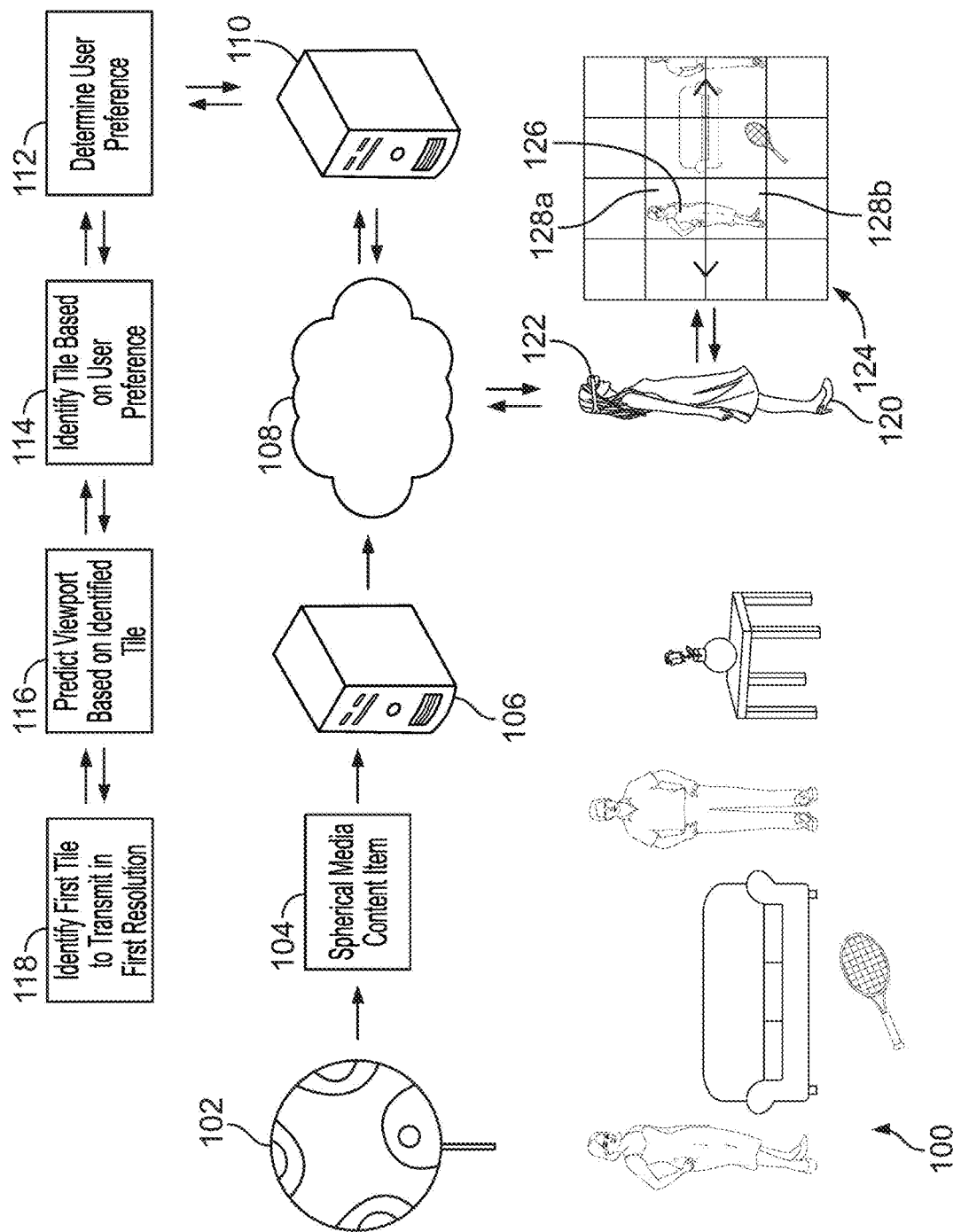
FIG. 1B shows another example environment in which a viewport is generated for display, in accordance with some embodiments of the disclosure.

FIG. 1B shows another example environment in which a viewport is generated for display, in accordance with some embodiments of the disclosure. FIG. 1B shows the same environment as that shown in FIG. 1A; however, the steps of determining a user preference 112; identifying one or more tiles 114 based on the user preference; predicting a viewport 116 based on the one or more identified tiles; and identifying one or more first tiles 118 to transmit in a first resolution are carried out at the server 110.

Figure 2:
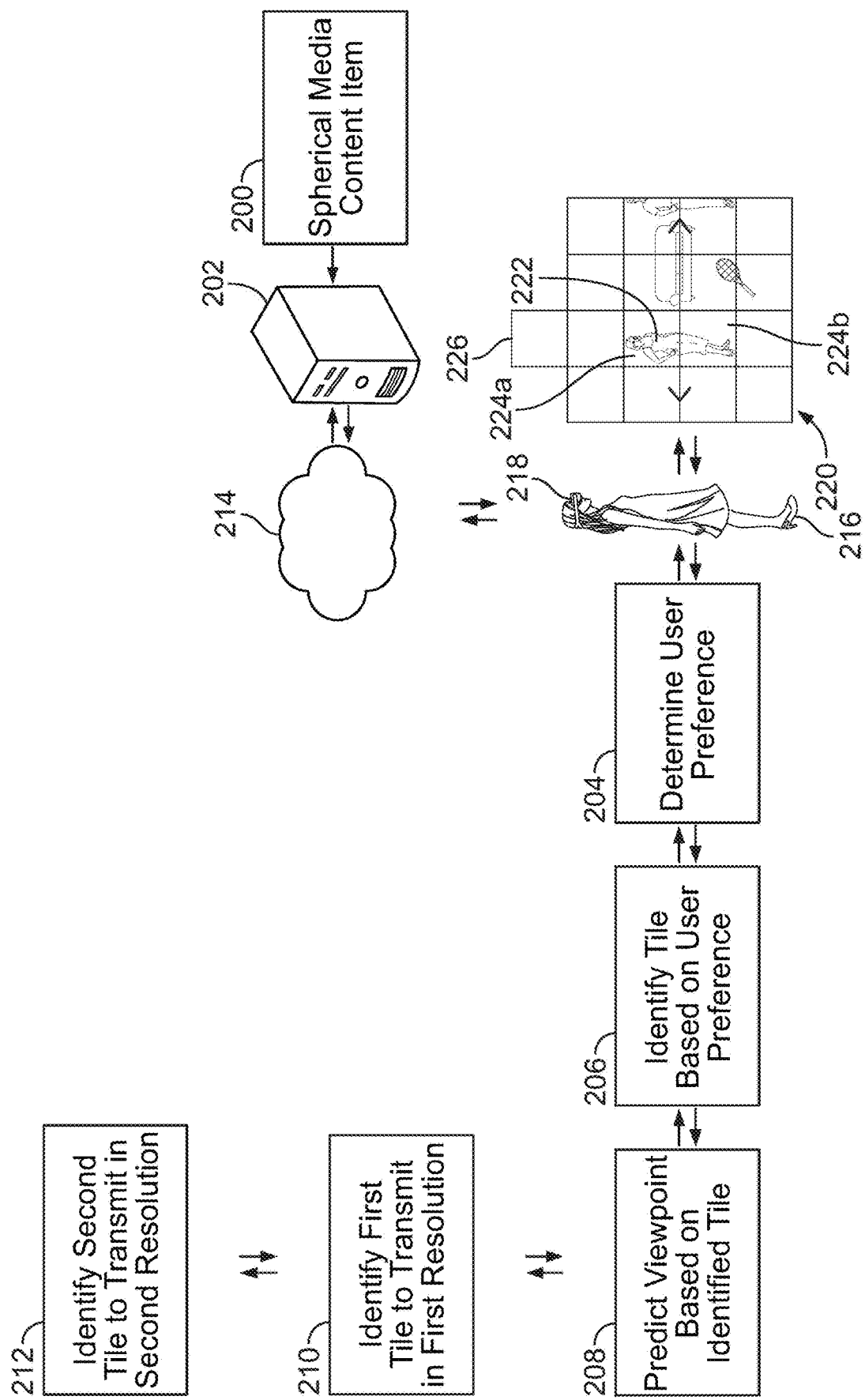
FIG. 2 shows another example environment in which a viewport is generated for display, in accordance with some embodiments of the disclosure.

FIG. 2 shows another example environment in which a viewport is generated for display, in accordance with some embodiments of the disclosure. In a similar manner to the environment depicted in FIG. 1A, the environment comprises a server 202 on which a spherical media content item 200 is stored. As in the environment depicted in FIG. 1A, a user preference for a character and/or a genre of a scene in a spherical media content item is determined 204, and one or more tiles of the spherical media content item 200 are identified 206 based on the determined user preference. Again, a viewport is predicted 208 based on the identified tiles and one or more first tiles to transmit in a first resolution are identified 210 based on the predicted viewport. One or more second tiles to transmit in a second resolution are also identified 212 based on the predicted viewport. For example, one or more second tiles may be identified to be transmitted at a second resolution lower than the one or more first tiles (e.g., 4K if the first resolution is 8K, 1080p if the first resolution is 4K, 720p if the first resolution is 1080p). These one or more second tiles may be tiles that are proximate the predicted viewport but are not part of the predicted viewport. The identified first and second tiles are requested and transmitted from the server 202, via a network 214, to the VR device 218 that, in this example, is worn by a user 216. If the viewport at the VR device 218 is as predicted, then the transmitted one or more first tiles are generated for display and are displayed to the user 216 at the VR device 218. However, if the user, for example, moves their head in a manner that was not predicted, then the one or more second tiles may be generated for display and displayed to the user if they fall within the viewport. If neither the first nor second tiles fall within the viewport then an additional tile or tiles are requested and are transmitted to the VR device 218 from the server 202. The one or more second tiles may be stored in a cache at the VR device 218 and may be discarded if not needed to generate the viewport for display at the VR device 218. Transmitting the one or more second tiles at a second resolution that is lower than the first resolution enables bandwidth to be saved but at the same time enables a tile or tiles to be displayed to the user if they move their head in a manner that is different than that predicted.

As before, a representation of the viewport 220 is shown along with the tiles 224a, 224b associated with the preferred character 222. As can be seen, the second tile 226 does not form part of the viewport but is proximate the viewport. If, in this example, the user were to move their head upwards, the tile 226 would already be stored at the VR device 218 and would be generated for display and displayed more quickly than if the tile had to be requested from the server 202.

Figure 3:
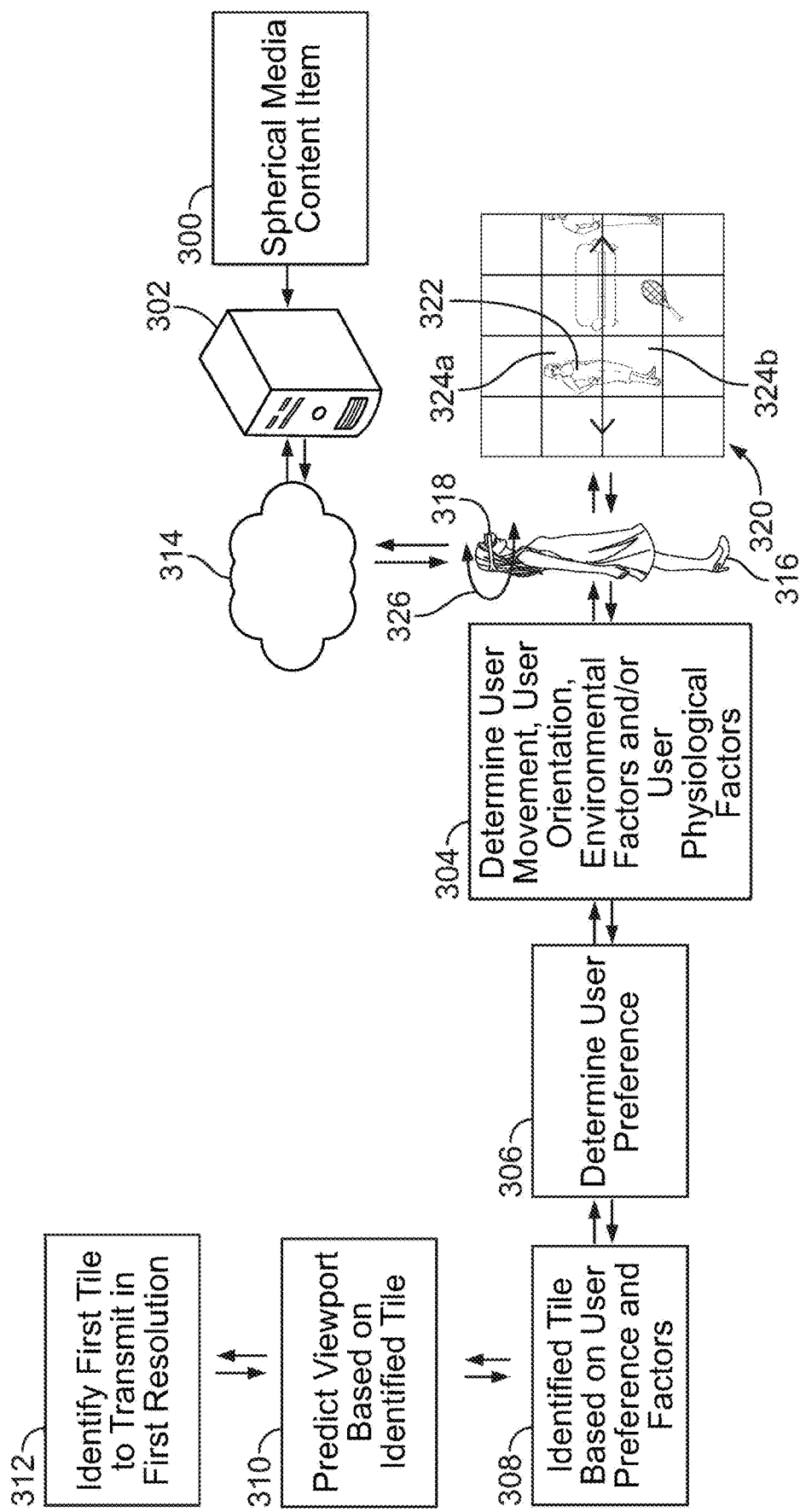
FIG. 3 shows another example environment in which a viewport is generated for display, in accordance with some embodiments of the disclosure.

FIG. 3 shows another example environment in which a viewport is generated for display, in accordance with some embodiments of the disclosure. Similar to the environment depicted in FIGS. 1 and 2, the environment comprises a server 302 on which a spherical media content item 300 is stored. A user movement, a user orientation, an environmental factor and/or a user physiological factor is determined 304. Collectively, these may be referred to as "factors." For example, a sensor of a VR device 318 being worn by a user 316 may comprise a sensor for determining a user head movement 326. In this example, the sensor may record data about the user head movement. In other examples, sensors of the VR device 318 may record other data. In some examples, data with respect to the factors may be transmitted to the server 302 via the network 314 for additional analysis, and the analysis may be transmitted back to the VR device 318. This may include user eye gaze data and or user orientation data. In some examples, a saliency map may be generated. In other examples, a sensor of the VR device 318 (or a sensor of, for example, a household smart device) may utilize environmental data, such as room temperature data. A household smart device may be configured to communicate with the VR device 318 via, for example, a home Wi-Fi network. In other examples, one or more physiological parameters of the user, including a user heart rate, may be monitored via, for example, a sensor of the VR device 318, a smart heart rate monitor and/or a smartwatch. For example, a user who is watching a horror movie may be likely to look away from scary content if their heart rate increases rapidly. In some examples, the factors may be associated with a user profile stored at the server 302 in order to generate a factor profile for a television series or a genre of content. This user profile may be accessed by the VR device 318 to assist it with viewport prediction when the user profile accesses a similar content item, such as a different episode of the television series or a movie of a similar genre. In some examples, a user preference for a character and/or a genre of a scene in a spherical media content item is determined 306, and one or more tiles of the spherical media content item 300 are identified 308 based on the determined user preference and at least one of the determined factors. Again, a viewport is predicted 310 based on the one or more identified tiles, and one or more first tiles to transmit in a first resolution to the VR device 318, via the network 314, are identified 312 based on the predicted viewport. The one or more identified first tiles are transmitted from the server 302, via the network 314, to the VR device 318, where, if the viewport is as predicted, they are generated for display. As before, a representation of the viewport 320 is shown along with the tiles 324a, 324b associated with the preferred character 322.

Figure 4:
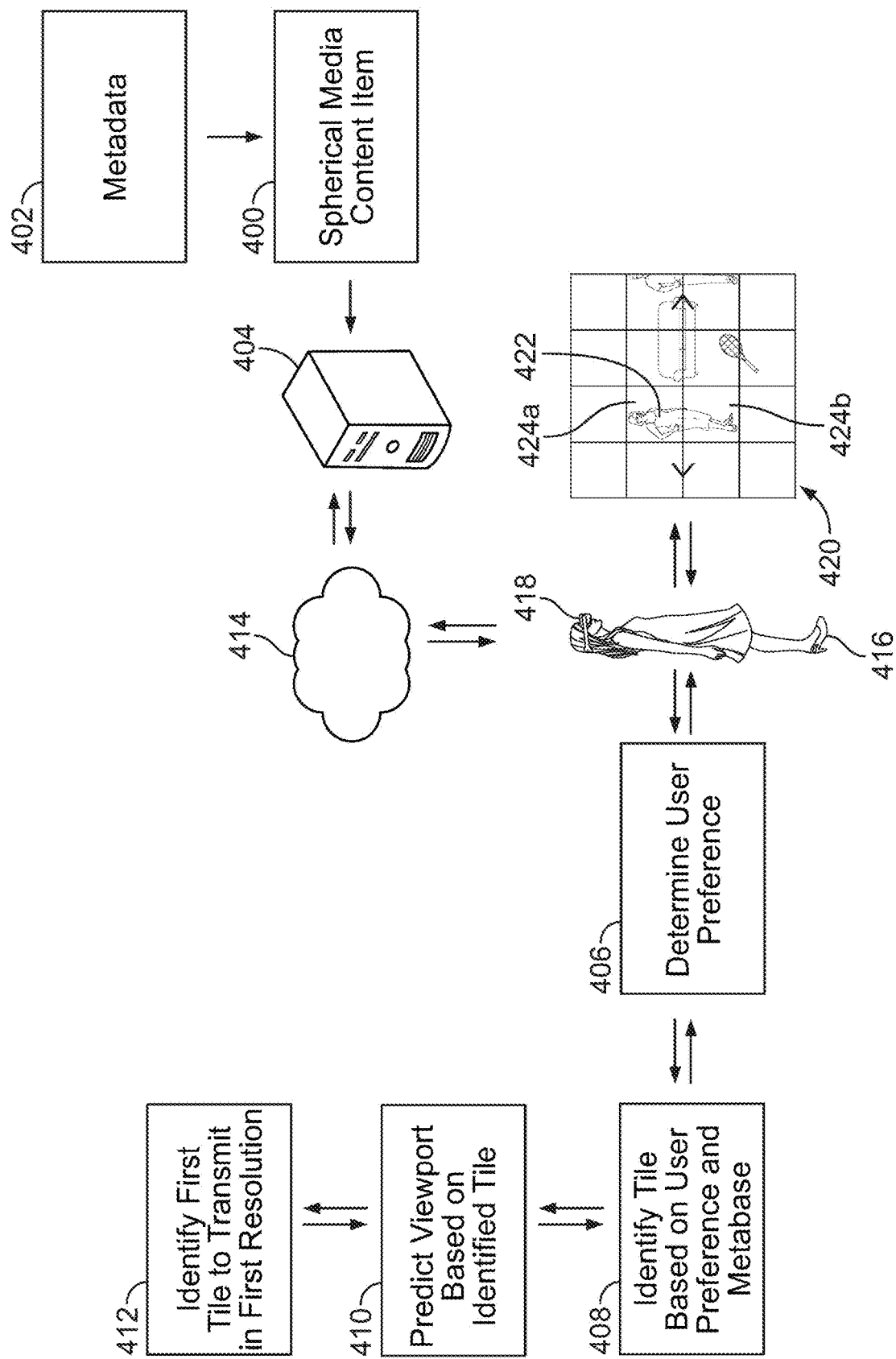
FIG. 4 shows another example environment in which a viewport is generated for display, in accordance with some embodiments of the disclosure.

FIG. 4 shows another example environment in which a viewport is generated for display, in accordance with some embodiments of the disclosure. In a similar manner to the environments previously depicted, the environment comprises a server 404 on which a spherical media content item 400 is stored. The spherical media content item 400 comprises metadata 402. This metadata 402 may be deep-scene metadata, such as the metadata used to generate the Amazon X-Ray feature, which describes the present and/or upcoming location of a character in the spherical media content item 400. This metadata may be generated manually or via an algorithm. In addition, in some examples, the metadata 402 may be generated from the spherical media content item 400 itself via, for example, audio and/or video processing and/or object detection algorithms. This generation of metadata 402 may be performed at the server 404, before the spherical media content item 400 is transmitted to a computing device. In other examples, this metadata 402 may be generated on the fly, substantially at the same time that the spherical media content item is transmitted to a computing device and, optionally, may be stored at the server 404. The metadata 402 may be stored in a header of the spherical media content item 400. In other examples, the metadata 402 may be stored in a separate file that is associated with the spherical media content item 400. A user preference for a character and/or a genre of a scene in a spherical media content item is determined 406 and one or more tiles of the spherical media content item 400 are identified 408 based on the determined user preference and at least some of the metadata 402. Again, a viewport is predicted 410 based on the one or more identified tiles, and one or more first tiles to transmit to a VR device 418 in a first resolution are identified 412 based on the predicted viewport. The one or more tiles are requested and transmitted, via a network 414, from the server to the VR device 418 worn by the user 416, where, if the viewport is as predicted, they are generated for display. As before, a representation of the viewport 420 is shown along with the tiles 424a, 424b associated with the preferred character 422.

Figure 5:
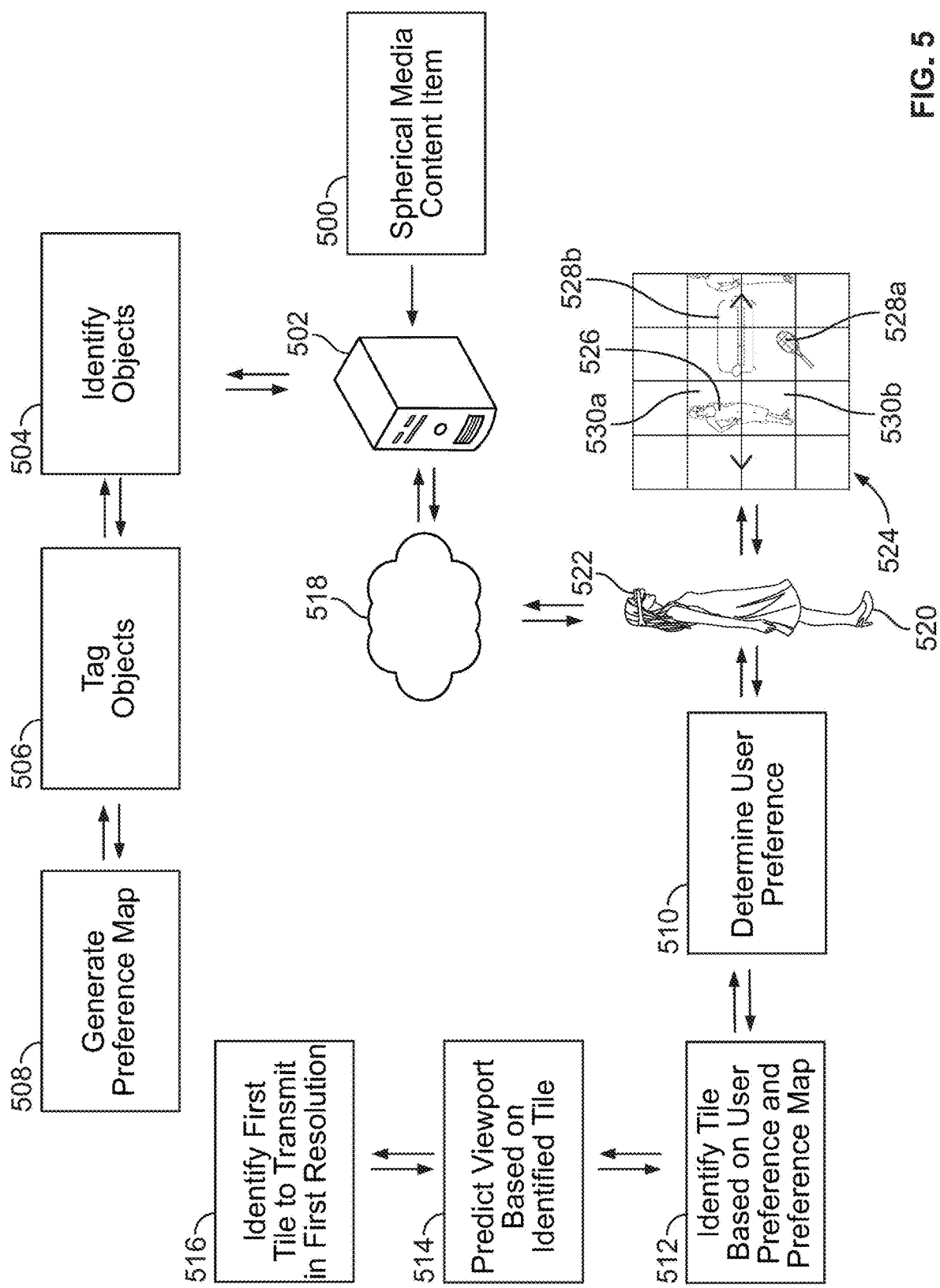
FIG. 5 shows another example environment in which a viewport is generated for display, in accordance with some embodiments of the disclosure.

FIG. 5 shows another example environment in which a viewport is generated for display, in accordance with some embodiments of the disclosure. In a similar manner to the environments previously depicted, the environment comprises a server 502 on which a spherical media content item 500 is stored. The spherical media content item 500 is analyzed at the server 502 to identify objects 504. For example, the analysis of the spherical media content item 500 may take place during an existing operation, such as an encoding and/or compressing operation that is applied to the spherical media content item 500. The object identification may be performed by any suitable known object detection algorithm. On identifying objects, the objects are tagged 504. For example, the objects may have tags comprising identification codes assigned to them. The identification codes may be numerical codes and/or alphanumerical codes. The identified objects and the corresponding tags may be stored in a database on the server 502 in a manner that enables the database to be queried such that a tag is returned for a given object. Identified objects that are the same may be assigned the same tag (or identification code). A preference map that maps a user preference for at least a subset of the identified objects is generated 508. For example, a sensor of a VR device 522 may monitor user gaze, and the preference map may be generated based on how long a user looks at each identified object. In some examples, multiple preference maps, or preference files, can be generated for the same spherical media content item, and the preference map that most closely matches the determined user preference is utilized. The preference map is transmitted to the VR device 522.

At the VR device 522, a user preference for a character and/or a genre of a scene in a spherical media content item is determined 510, and one or more tiles of the spherical media content item 500 are identified 512 based on the determined user preference and the preference map. For example, it may be determined that a user is interested both in Marty and a tennis racket that Marty is holding, as indicated by a user's head movement and/or gaze. If, for example, Marty puts down the tennis racket, tiles corresponding to both Marty and the tennis racket are identified. The tiles in any given frame can be assigned a priority based on a user profile associated with a media content item that is being streamed. For example, tagged objects may be associated with a user profile. It may be determined that the user profile is associated with historically looking at and then turning away from certain objects (for example, an injured person), and tiles associated with these objects are given a lower priority. This priority may be indicated in the user profile to assist with viewport prediction. Similarly, a priority score associated with a user profile can take into account metadata of content that was watched and then subsequently abandoned shortly after viewing started, or metadata of content that was explicitly blocked for the user profile (for example, due to parental controls).

Again, a viewport is predicted 514 based on the identified one or more tiles, and one or more first tiles to transmit to a VR device 522 in a first resolution are identified 516 based on the predicted viewport. The one or more tiles are requested and transmitted, via a network 518, from the server 502 to the VR device 522 worn by the user 520, where, if the viewport is as predicted, they are generated for display. As before, a representation of the viewport 524 is shown along with the tiles 530a, 530b associated with the preferred character 526. In addition, the tennis racket 528a has been tagged, and the sofa 528b has also been tagged.

In some examples, multiple viewports may be predicted and may be encoded at the highest resolutions for a set amount of time, such as five seconds. This may be particularly beneficial if a user has a similar likelihood of looking in two different directions in the near future.

In some examples, a preference map can be pre-generated and used as framework to prepare spherical media content items (for example, newly released movies or TV episodes) for transmitting or streaming. If many user devices start requesting (and streaming) a spherical media content item once it become available, the pre-generation of a preference map (or maps) can be used for more efficient encoding of tiles of spherical media content items and the caching of tiles of spherical media content items at a server, or servers, in order to reduce the likelihood of buffering and to provide an improved quality of experience to a user.

Figure 6:
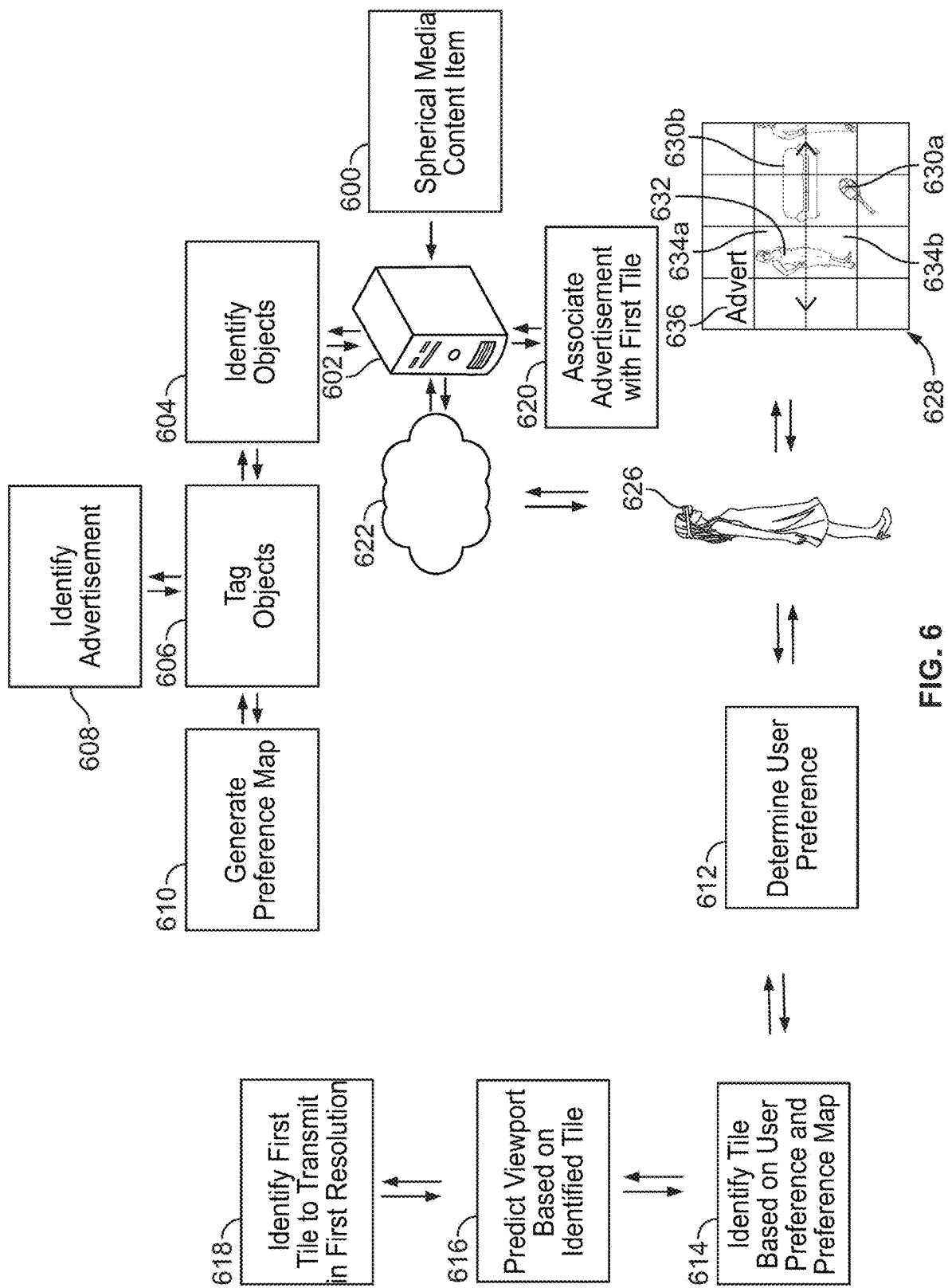
FIG. 6 shows another example environment in which a viewport is generated for display, in accordance with some embodiments of the disclosure.

FIG. 6 shows another example environment in which a viewport is generated for display, in accordance with some embodiments of the disclosure. In a similar manner to the environments previously depicted, the environment comprises a server 602 on which a spherical media content item 600 is stored. In a similar manner to the environment depicted in FIG. 5, the spherical media content item 600 is analyzed at the server 602 to identify objects 604 and tag the identified objects 606. In addition, an advertisement is identified 608 based on the tagged objects. For example, if a can of Pepsi is identified, then an advertisement for Pepsi may be identified. A preference map that maps a user preference for at least a subset of the identified objects is generated 610. The preference map is transmitted to a VR device 626. A user preference for a character and/or a genre of a scene in the spherical media content item is determined 612, and one or more tiles of the spherical media content item 600 are identified 614 based on the determined user preference and the preference map. Again, a viewport is predicted 616 based on the identified one or more tiles, and one or more first tiles to transmit to the VR device 626 in a first resolution are identified 618 based on the predicted viewport. The one or more tiles are requested, via the network 622, from the server 602. In response to receiving the request, at the server 602, an advertisement is associated 620 with at least one tile of the one or more first tiles. The one or more tiles and the advertisement are transmitted, via a network 622, from the server 602 to the VR device 626 worn by the user, where, if the viewport is as predicted, they are generated for display. The spherical media content item and the advertisement may be delivered from the same server 602. In other examples, the spherical media content item may be delivered from a first server, and the advertisement may be delivered from a second server. As before, a representation of the viewport 628 is shown along with the tiles 634a, 634b associated with the preferred character 632. In addition, the tennis racket 630a has been tagged, and the sofa 630b has also been tagged.

Data from multiple VR devices can be collected at a server to enable access to granular data about user movements, viewports, and objects of interest, such as those discussed above. This data can be used to serve, and target, advertisements to users. Advertisement networks can utilize such data to serve advertisements based on, for example, user head movements, and other monitored data including physiological data. This data can be used to determine which viewports within an advertisement to emphasize.

Figure 7:
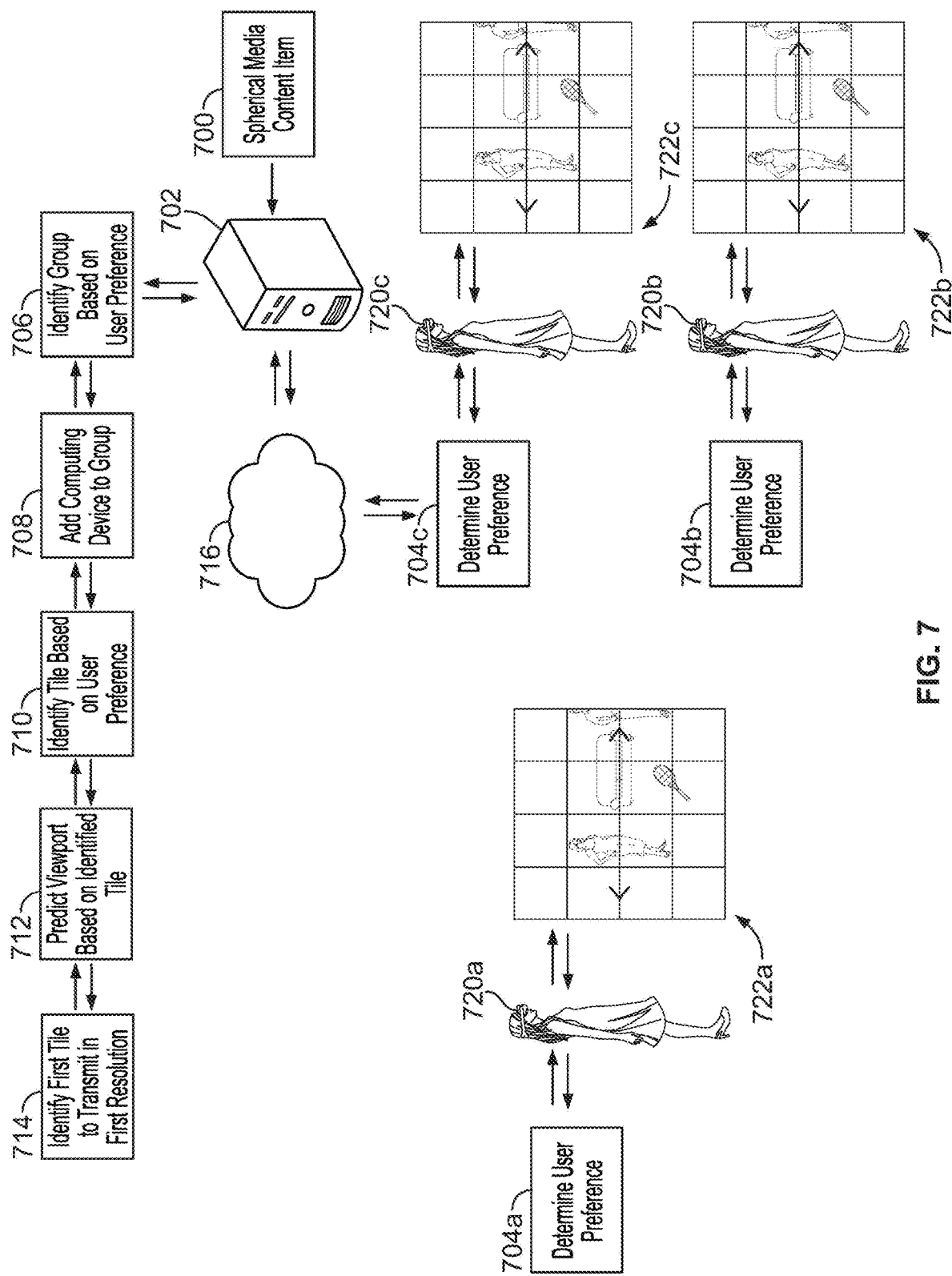
FIG. 7 shows another example environment in which a viewport is generated for display, in accordance with some embodiments of the disclosure.

FIG. 7 shows another example environment in which a viewport is generated for display, in accordance with some embodiments of the disclosure. In a similar manner to the environments previously depicted, the environment comprises a server 702 on which a spherical media content item 700 is stored. As before, a user preference for a character and/or a genre of a scene in a spherical media content item is determined 704a, 704b, 704c and is associated with a VR device 720a, 720b, 720c. The determined user preferences and indicators of the associated VR devices are transmitted, via the network 716, to the server 702. On receiving the user preferences, at the server 702, a group 708 is identified 706 based on the user preferences, and each VR device 720a, 720b, 720c for which an associated user preference meets the group criteria is added to the group. For example, if it is determined that the user preference is for the character Marty, then the computing device is added to a group of other computing devices wherein it has been determined that the user preference is for the character Marty. As the group of user devices are all associated with the same user preference, the same one or more tiles are identified 710 based on the user preference for all of the computing devices in the group. In addition, the same viewport is predicted 712 based on the identified one or more tiles for all of the computing devices in the group, and the same one or more first tiles are identified to transmit in the first resolution. The one or more first tiles are transmitted from the server 702 to all of the computing devices in the group, in this example VR devices 720a, 720b, 720c, where, if the viewports are as predicted, they are generated for display. In this example, the same viewport 722a, 722b, 722c is associated with all of the VR devices 720a, 720b, 720c; however, in some examples, there may be variations between the viewports due to, for example, user head movements. Nevertheless, it is anticipated that there will be substantial overlap between the viewports due to the same identified user preference. All of the VR devices 720a, 720b, 720c can be assigned to the same streaming server, or group of streaming servers, as at least substantially similar content will be delivered to these devices. In this way, the load on the servers will be reduced because the same, or substantially the same, content (i.e., the same tiles, or at least a subset of the same tiles) is being delivered to all of the computing devices.

In one example, user devices may be assigned to one or more streaming servers that subscribe to one or more viewports (from an encoder/packager) that are predicted to be popular. For example, user devices that are receiving a live event, such as a football game, are likely to generate requests for the same, or very similar, viewpoints, as users are likely to look in the same (or similar) direction/portion of the spherical media content item where their team or favorite players(s) are present, for example, when there is no real action in the game or during a timeout. As discussed above, user devices can therefore be grouped based on their preferences and assigned to specific streaming servers. This can help to reduce the load on streaming servers since these servers will be serving the same (or similar) tiles to a group of users.

Figure 8:
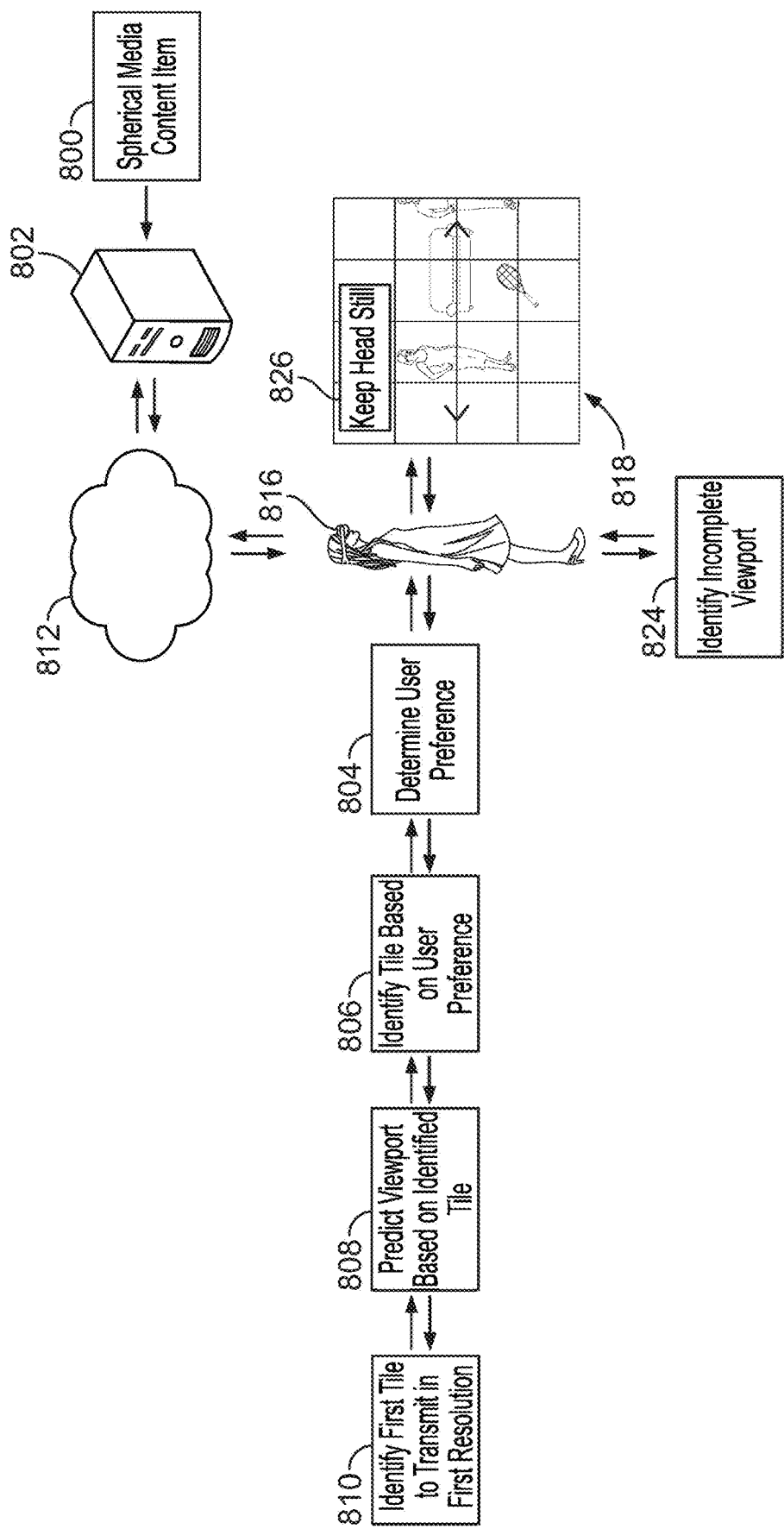
FIG. 8 shows another example environment in which a viewport is generated for display, in accordance with some embodiments of the disclosure.

FIG. 8 shows another example environment in which a viewport is generated for display, in accordance with some embodiments of the disclosure. In a similar manner to the environments previously depicted, the environment comprises a server 802 on which a spherical media content item 800 is stored. As before, a user preference for a character and/or a genre of a scene in a spherical media content item is determined 804. One or more tiles of the spherical media content item 800 are identified 806 based on the determined user preference. Again, a viewport is predicted 808 based on the identified tiles, and one or more first tiles to transmit in a first resolution are identified 810 based on the predicted viewport. The one or more first tiles are requested and transmitted from the server 802, via a network 812, to a VR device 816, where, if the viewport is as predicted, they are generated for display. However, if the server 802 is experiencing high load and/or there are bandwidth issues with the network 812, then the VR device may not receive all of the required tiles to generate a viewport, and the VR device may identify that an incomplete viewport 824 will be generated. This issue may be exacerbated if the user moves their head, thereby requesting additional tiles. In order to mitigate this issue, a notification 826 may be generated for display in the viewport instructing the user to, for example, keep their head still.

Figure 9:
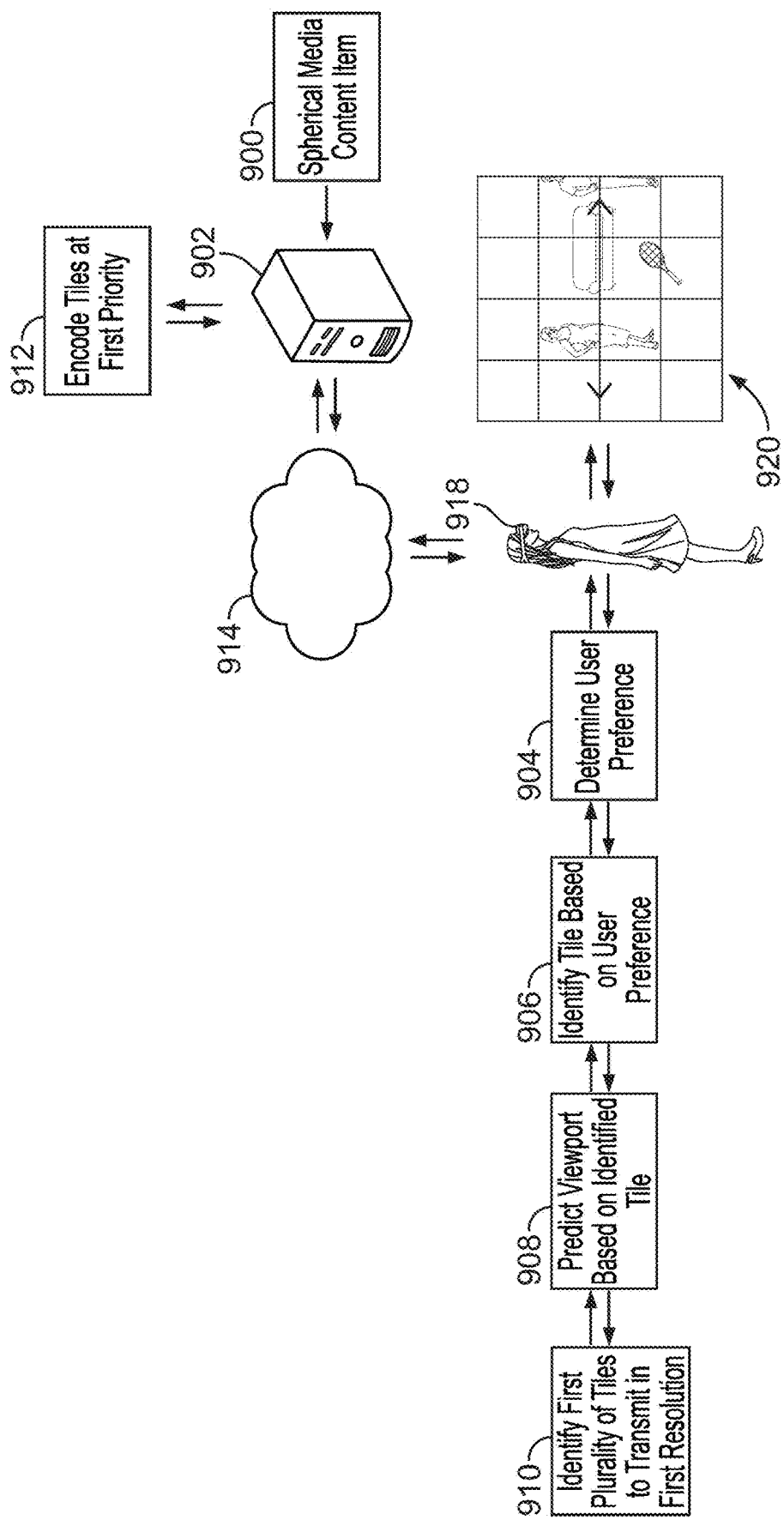
FIG. 9 shows another example environment in which a viewport is generated for display, in accordance with some embodiments of the disclosure.

FIG. 9 shows another example environment in which a viewport is generated for display, in accordance with some embodiments of the disclosure. In a similar manner to the environments previously depicted, the environment comprises a server 902 on which a spherical media content item 900 is stored. As before, a user preference for a character and/or a genre of a scene in a spherical media content item is determined 904. One or more tiles of the spherical media content item 900 are identified 906 based on the determined user preference. Again, a viewport is predicted 908 based on the identified tiles, and one or more first tiles to transmit in a first resolution are identified 910 based on the predicted viewport. The one or more first tiles are requested from the server 902. At the server 902, the one or more first tiles are assigned a first priority to be encoded 912 and, once the tiles are encoded, they are transmitted from the server 902, via a network 914, to a VR device 918, where, if the viewport 920 is as predicted, they are generated for display. In some examples, the tiles of a spherical media content item are ranked for a streaming session, such as a streaming session associated with a session identifier, and recommendations are made via a manifest file or via other data transfer means.

In an example, a viewport prediction service can be utilized to aid with streaming spherical media content items for live events. For example, the viewport prediction can take place at a server, rather than at a computing device such as a VR device. An encoder can predict tiles of interest in a frame of a spherical media content item (e.g., based on tracking motion of objects of interest within that frame as well as subsequent frames) and from data it receives from the viewport prediction service. The encoder, and corresponding packager, may process content strategically and prioritize tiles associated with an area or region of interest. For example, a group of tiles (for example, a group that depicts a preferred character) may have a center (x, y), and an area to be encoded at a high bit rate (i.e., that corresponds with a predicted popular viewport) will extend a certain distance in the x and y directions in the current frame and in subsequent related frames of the spherical media content item. Tiles for such regions may be assigned a high (or highest) priority and tiles in other regions may be assigned a lower priority in scenarios where a streaming server experiences heavy loads, which can be used to improve latency. In some examples, a service running on a streaming server can generate a notification to enable such an encoding mode. This notification may be transmitted to an encoder that the streaming server is receiving the streamed spherical media content items from (directly, or indirectly via intermediaries) for delivery to computing devices, such as VR devices.

In another example, the encoders and packagers may be assigned to process only specific viewports based on messages from a viewport prediction service running on a server. The viewport prediction service may have access to historical data as well as real-time data regarding viewports, user head movements, user eye gazes, user physiological parameters (e.g., heart rates), user preferences (including preferences for content and entities such as genres and personalities), trick-play actions performed while watching regular videos (i.e., non-360-degree videos), health of streaming servers (e.g., current load on streaming servers) and/or the popularity of a spherical media content item. This metadata may be used to assist the encoder in prioritizing the processing of specific areas or regions of interest to a group or cluster of users. The similarities and correlations of such metadata between different groups of users may enable the viewport prediction algorithm to group users based on past and/or current behavior while consuming spherical media content items and based on their preferences.

Figure 10:
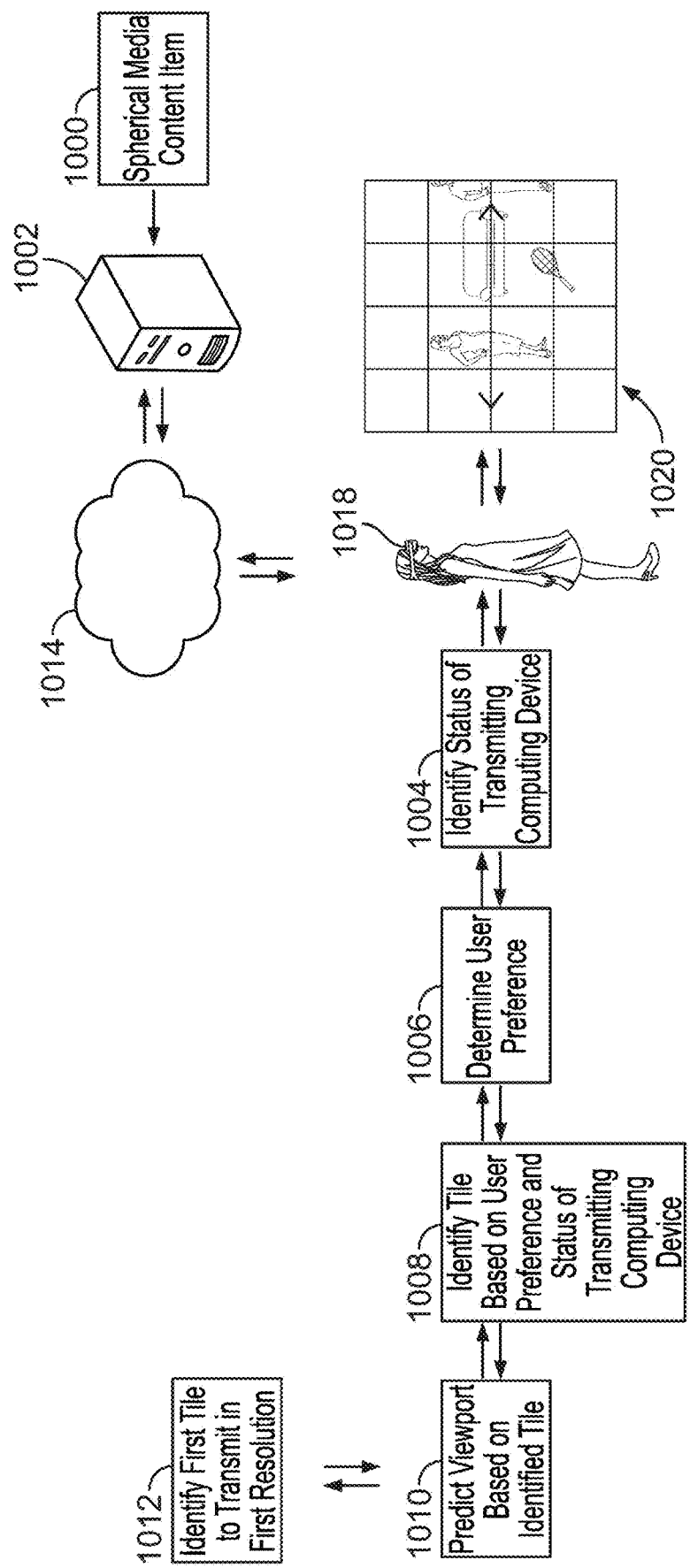
FIG. 10 shows another example environment in which a viewport is generated for display, in accordance with some embodiments of the disclosure.

FIG. 10 shows another example environment in which a viewport is generated for display, in accordance with some embodiments of the disclosure. In a similar manner to the environments previously depicted, the environment comprises a server 1002 on which a spherical media content item 1000 is stored. A status of the transmitting computing device (for example, the server 1002) is identified 1004 at a VR device 1018. This may be achieved via monitoring the server 1002 or via a service message received from the server 1002. For example, it may be identified that the server is experiencing high load levels and/or bandwidth constraints. As before, a user preference for a character and/or a genre of a scene in a spherical media content item is determined 1006. One or more tiles of the spherical media content item 1000 are identified 1008 based on the determined user preference and the status of the transmitting computing device, in this example the server 1002. For example, the server 1002 may have enough resources to deliver only a subset of the tiles of the spherical media content item 1000. In this case, the user preference may be based on the tiles that are available. Again, a viewport is predicted 1010 based on the identified tiles, and one or more first tiles to transmit in a first resolution are identified 1012 based on the predicted viewport. The one or more first tiles are requested and are transmitted from the server 1002, via a network 1014, to the VR device 1018, where, if the viewport 1020 is as predicted, they are generated for display.

Viewport prediction may be more challenging while streaming a live event from a server to a VR device, since a user of a VR device can abruptly turn their head in order to follow something that happens during the event, for example if a user is watching a sports game or a live concert. In an example system, a streaming server that is overburdened by requests for tiles of spherical media content items may transmit only part of a 360-degree frame (i.e., a subset of the tiles that make up the media content item, rather than the whole frame). In such a scenario, a user may be able to consume the spherical media content item but not look in all directions. The streaming server can transmit a notification to a user device, such as an omnidirectional video player running on a VR device, of which tile (or tiles) are missing. As discussed above, a message or a notification can be generated for display to recommend a user wearing the VR device does not make wide turns (e.g., a message might read "Do not turn your head more than 45 degrees to the right"). The message may disappear after a media player running on a computing device finishes rendering a segment of the spherical media content item. Such frames (i.e., a frame comprising all of the tiles) may be frames belonging to a future segment (e.g., a segment that occurs four seconds in the future) rather than the current segment that is being rendered. The subset of the tiles not to transmit may be based on a predicted viewport as described above.

In another example, viewports of users watching a live event may be used to determine a direction that other users are likely to look in. Based on this determination, a recommendation may be generated and transmitted to other computing devices, such as VR devices, to generate for display to a user using the VR device to look in a certain direction. Common viewports may be viewports that a percentage threshold of the total number of viewers watching an event or a content item are looking at. Since it is unlikely that exactly the same viewport will be generated at multiple user devices, the popular viewports may be determined based on a threshold overlap between corresponding viewports. In one example, this can be determined by monitoring the tiles that are requested first (for example, high resolution and/or highest bitrate) from a streaming server. This may be a good indication of a predicted future viewport. Such tiles can be mapped to quadrants of a frame of a spherical media content item, and this information may be used in real time to determine spikes in general head movement changes. For example, a spike in requests by media players running on a plurality of computing devices for high resolution tiles that are completely outside of the common viewports may be considered as a new region of interest. For example, in a football game, the common viewports may be any area that shows where a play is occurring on the field. A spike in high resolution requests for tiles that are associated with the sidelines or the crowds might indicate that something of interest is happening there. In addition, the length of the spike may be taken into consideration. In some examples, a threshold length of spike may be applied (e.g., more than 8 seconds).

Figure 11:
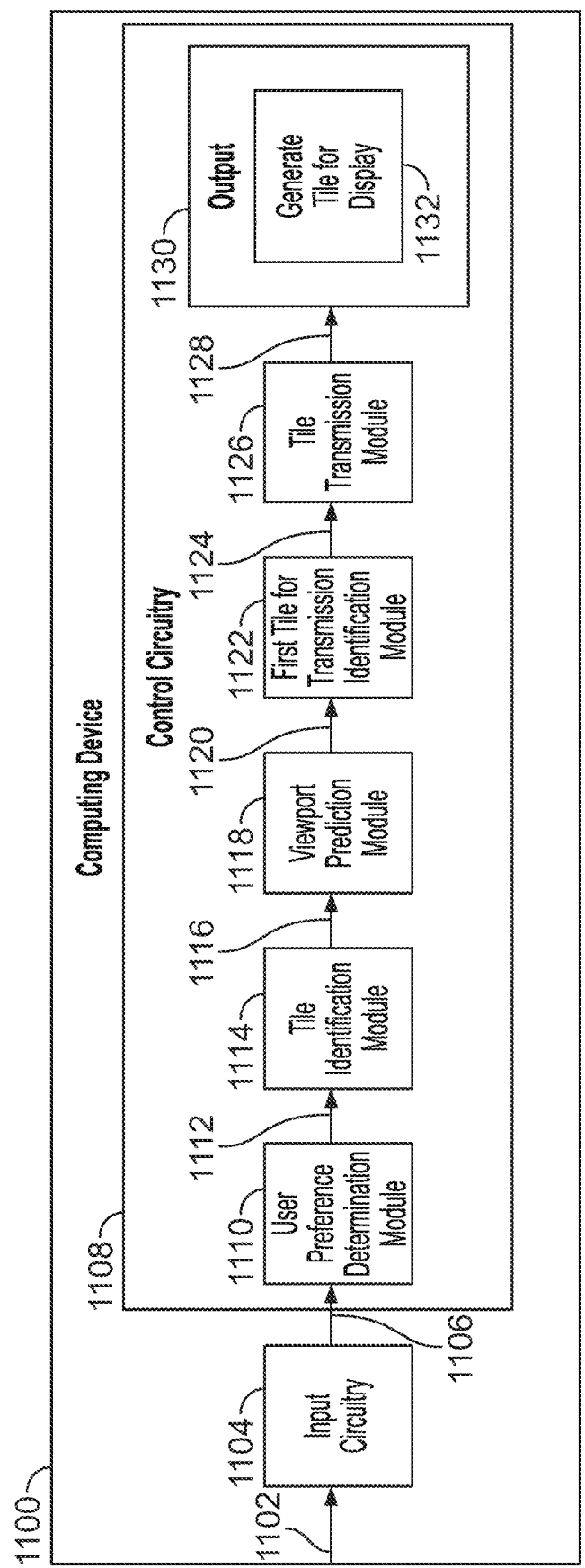
FIG. 11 shows a block diagram representing components of a computing device and data flow therebetween for generating a viewport for display, in accordance with some embodiments of the disclosure.

FIG. 11 shows a block diagram representing components of a computing device and data flow therebetween for generating a viewport for display, in accordance with some embodiments of the disclosure. Computing device 1100 (e.g., VR device 122, 218, 318, 418, 522, 626, 720, 816, 918, 1018) as discussed above comprises input circuitry 1104, control circuitry 1108 and an output module 1130. Control circuitry 1108 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware or software.

A user provides an input 1102 that is received by the input circuitry 1104. The input circuitry 1104 is configured to receive a user input related to a computing device. For example, this may be via a virtual reality headset input device, touchscreen, keyboard, mouse, microphone, infrared controller, Bluetooth controller and/or Wi-Fi controller of the computing device 1100. The input circuitry 1104 transmits 1106 the user input to the control circuitry 1108.

The control circuitry 1108 comprises a user preference determination module 1110, a tile identification module 1114, a viewport prediction module 1118, a first tile for transmission identification module 1122, a tile transmission module 1126 and a generate tile for display module 1132. The user input is transmitted 1106 to the user preference determination module 1110. At the user preference determination module 1110, a user preference is determined. On determining a user preference, the user preference is transmitted 1112 to the tile identification module 1114, where a tile is identified based on the user preference. An indication of the identified tile is transmitted 1116 to the viewport prediction module 1118, where a viewport is predicted based on the identified tile. An indication of the predicted viewport is transmitted 1120 to the first tile for transmission identification module, where a first tile, based on the predicted viewport, is identified for transmission. An indication of the first tile is transmitted 1124 to the tile transmission module 1126, where the tile is transmitted 1128 to a computing device. At the computing device, the output module 1130 receives the tile, where the tile is generated for display at the generate tile for display module 1132.

Figure 12:
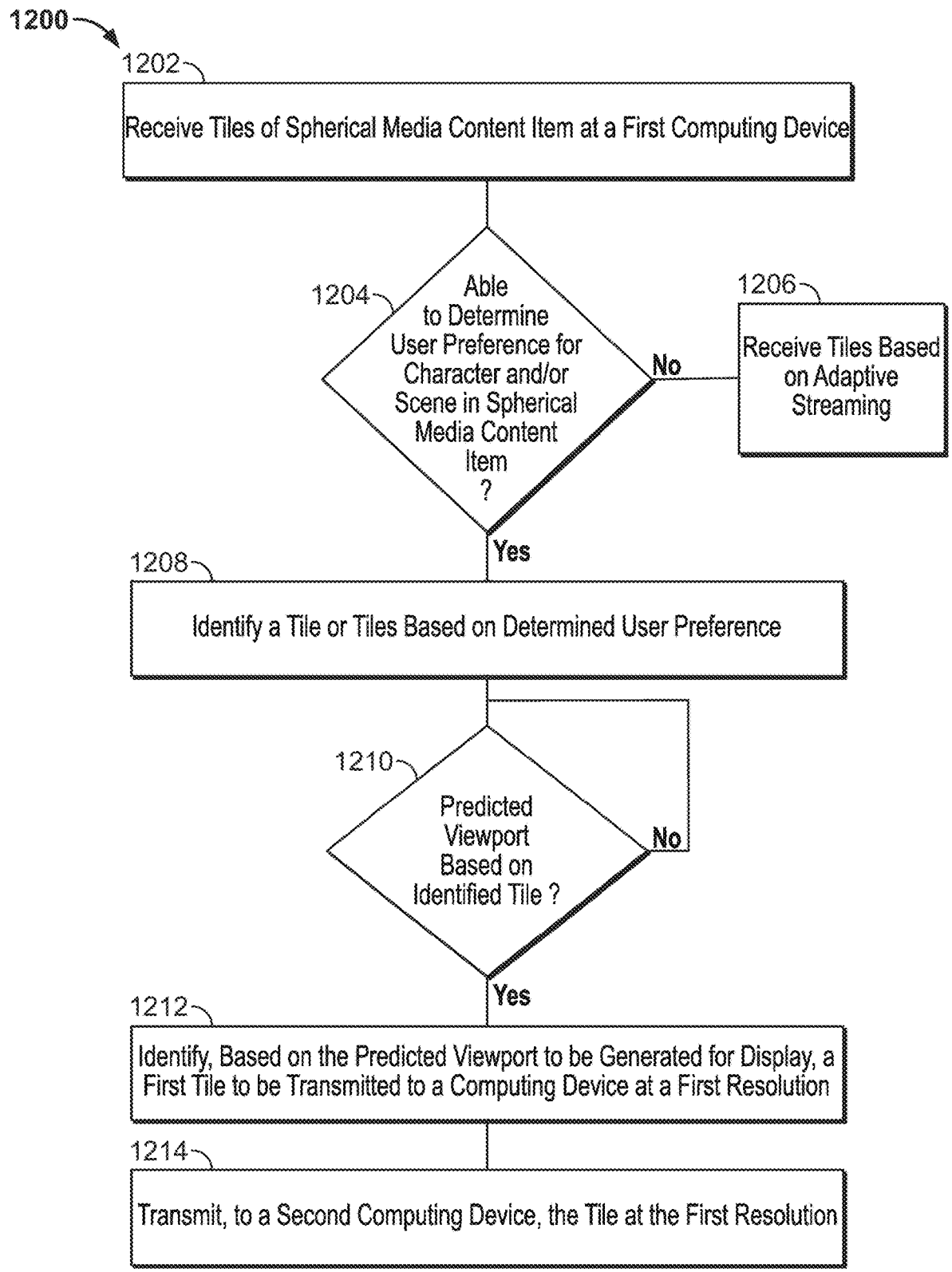
FIG. 12 shows a flowchart of illustrative steps involved in generating a viewport for display, in accordance with some embodiments of the disclosure.

FIG. 12 shows a flowchart of illustrative steps involved in generating a viewport for display, in accordance with some embodiments of the disclosure. Process 1200 may be implemented on any of the aforementioned computing devices (e.g., VR device 122, 218, 318, 418, 522, 626, 720, 816, 918, 1018). In addition, one or more actions of the process 1200 may be incorporated into or combined with one or more actions of any other process or embodiments described herein.

At 1202, the tiles of a spherical media content item are received at a first computing device, such as a server. At 1204, it is determined whether it is possible to determine a user preference for a character and/or a scene in a spherical media content item. If it is not possible to determine a user preference, then, at 1206, the tiles are received based on adaptive streaming. If it is possible to determine a user preference then, at 1208, a tile or tiles are identified based on the determined user preference. At 1210, it is attempted to predict a viewport based on the identified tile or tiles. This item loops until a viewport is predicted. At 1212, the first tile, or tiles, to be transmitted to a computing device at a first resolution are identified based on the predicted viewport to be generated for display, and, at 1214, the tile, or tiles, at the first resolution are transmitted to a second computing device, such as a VR headset.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
 receiving a spherical media content item comprising a plurality of tiles;
 determining a user preference for a scene type in the spherical media content item, wherein the user preference is based on a plurality of users;
 identifying, based on the user preference, a subset of the plurality of tiles;
 predicting, based on the identified subset of tiles, a viewport to be generated for display at a computing device;
 identifying, based on the predicted viewport to be generated for display, a first subset of tiles to be transmitted to a computing device at a first resolution;
 encoding, at a first priority, the first subset of tiles at the first resolution, wherein tiles that are not included in the first subset of tiles are encoded at a second priority, and wherein the second priority is lower than the first priority; and
 transmitting, to the computing device, the first subset of tiles at the first resolution.

2. The method of claim 1, further comprising:
 identifying, based on the predicted viewport to be generated for display, a second subset of tiles to be received at the computing device at a second resolution, wherein the first resolution is higher than the second resolution; and
 receiving, at the computing device, the second subset of tiles at the second resolution.

3. The method of claim 1, further comprising:
 determining a user preference for a character in the spherical media content item; and
 assigning each tile that depicts the character as a tile of interest, wherein the assigning is based at least in part on using facial recognition to track the character throughout the spherical media content item.

4. The method of claim 1, wherein:
 metadata is associated with the spherical media content item; and
 identifying the subset of the plurality of tiles is further based on the metadata associated with the spherical media content item.

5. The method of claim 1, further comprising:
 identifying an advertisement;
 associating the advertisement with the first tile;
 transmitting, to the computing device, the advertisement;
 generating, at the computing device, the advertisement for display; and
 determining, based on input from a sensor of the computing device, an effectiveness of the advertisement.

6. The method of claim 1, further comprising:
 associating the determined user preference for the scene type with the computing device;
 adding the computing device to a group of computing devices, wherein the group is based on the determined user preference for the scene type associated with the computing device; and wherein:
  transmitting the first subset of tiles at the first resolution further comprises transmitting the first subset of tiles to the computing devices of the group of computing devices.

7. The method of claim 1, further comprising:
 identifying, based on the predicted viewport, an other subset of the plurality of tiles of the spherical media content;

transmitting the other subset of the plurality of tiles of the spherical media content to the computing device; and identifying at least one incomplete viewport comprising a tile not transmitted to the computing device; and, if the predicted viewport is within a threshold number of tiles of the incomplete viewport:

generating a notification for display.

8. The method of claim 1, wherein, in response to a request from a streaming server:

a viewport prediction server determines the user preference for the scene type;

the user preference for the scene type is transmitted, from the viewport prediction server, to an encoder;

wherein the encoder:
identifies the subset of the plurality of tiles;
predicts, based on the identified subset of the plurality of tiles, the viewport to be generated for display;
identifies, based on the predicted viewport to be generated for display, the first subset of tiles to be transmitted at the first resolution; and
encodes, at the first priority, the first subset of tiles at the first resolution.

9. The method of claim 1, wherein the identifying the first subset of tiles to be transmitted to the computing device at the first resolution is further based on a status of the computing device receiving the subset of tiles.

10. A system comprising:
input/output circuitry configured to:
receive a spherical media content item comprising a plurality of tiles;
processing circuitry configured to:
determine a user preference for a scene type in the spherical media content item, wherein the user preference is based on a plurality of users;
identify, based on the user preference, a subset of the plurality of tiles;
predict, based on the identified subset of tiles, a viewport to be generated for display at a computing device;
identify, based on the predicted viewport to be generated for display, a first subset of tiles to be transmitted to the computing device at a first resolution;
encode, at a first priority, the first subset of tiles at the first resolution, wherein tiles that are not included in the first subset of tiles are encoded at a second priority, and wherein the second priority is lower than the first priority; and
transmit, to the computing device, the first subset of tiles at the first resolution.

11. The system of claim 10, wherein the processing circuitry is further configured to:
identify, based on the predicted viewport to be generated for display, a second subset of tiles to be received at the computing device at a second resolution, wherein the first resolution is higher than the second resolution; and
receive at the computing device, the second subset of tiles at the second resolution.

12. The system of claim 10, wherein the control circuitry is further configured to:
determine a user preference for a character in the spherical media content item; and
assign each tile that depicts the character as a tile of interest wherein the assigning is based at least in part on using facial recognition to track the character throughout the spherical media content item.

13. The system of claim 10, wherein:
metadata is associated with the spherical media content item; and
the processing circuitry configured to identify the subset of the plurality of tiles is further configured to identify the subset of the plurality of tiles based on the metadata associated with the spherical media content item.

14. The system of claim 10, wherein the processing circuitry is further configured to:
identify an advertisement;
associate the advertisement with the first tile;
transmit, to the computing device, the advertisement;
generate, at the computing device, the advertisement for display; and
determine, based on input from a sensor of the computing device, an effectiveness of the advertisement.

15. The system of claim 10, wherein the processing circuitry is further configured to:
associate the determined user preference for the scene type with the computing device;
add the computing device to a group of computing devices, wherein the group is based on the determined user preference for the scene type associated with the computing device; and wherein:
the processing circuitry configured to transmit the first subset of tiles at the first resolution is further configured to transmit the first subset of tiles to the computing devices of the group of computing devices.

16. The system of claim 10, wherein the processing circuitry is further configured to:
identify, based on the predicted viewport, another subset of the plurality of tiles of the spherical media content;
transmit the another subset of the plurality of tiles of the spherical media content to the computing device; and
identify at least one incomplete viewport comprising a tile not transmitted to the computing device; and, if the predicted viewport is within a threshold number of tiles of the incomplete viewport:
generate a notification for display.

17. The system of claim 10, wherein, in response to a request from a streaming server, the processing circuitry is further configured to:
determine, at a viewport prediction server, the user preference for the scene type;
transmit, from the viewport prediction server to an encoder, the user preference for the scene type;
identify, via the encoder, the subset of the plurality of tiles;
predict, via the encoder and based on the identified subset of the plurality tiles, the viewport to be generated for display;
identify, via the encoder and based on the predicted viewport to be generated for display, the first subset of tiles to be transmitted at the first resolution; and
encode, at the encoder and at the first priority, the first subset of tiles at the first resolution.

* * * * *